US009560543B2

United States Patent
Dominguez Romero et al.

(10) Patent No.: US 9,560,543 B2
(45) Date of Patent: Jan. 31, 2017

(54) METHOD FOR OPTIMIZING SIGNALLING LOAD IN A CELLULAR COMMUNICATION NETWORK

(71) Applicant: VODAFONE IP LICENSING LIMITED, Newbury, Berkshire (GB)

(72) Inventors: Francisco Javier Dominguez Romero, Madrid (ES); Timothy Frost, Madrid (ES); Yannick Le Pezennec, Madrid (ES)

(73) Assignee: Vodafone IP Licensing Limited, Newbury, Berkshire (GB)

( * ) Notice: Subject to any disclaimer, the term of this patent is extended or adjusted under 35 U.S.C. 154(b) by 101 days.

(21) Appl. No.: 14/396,818

(22) PCT Filed: Apr. 24, 2013

(86) PCT No.: PCT/GB2013/051044
§ 371 (c)(1),
(2) Date: Oct. 24, 2014

(87) PCT Pub. No.: WO2013/160681
PCT Pub. Date: Oct. 31, 2013

(65) Prior Publication Data
US 2015/0138984 A1    May 21, 2015

(30) Foreign Application Priority Data
Apr. 24, 2012   (ES) .................. 201230608

(51) Int. Cl.
*H04J 1/16*   (2006.01)
*H04W 28/02*   (2009.01)
(Continued)

(52) U.S. Cl.
CPC ....... *H04W 28/0221* (2013.01); *H04W 28/085* (2013.01); *H04W 36/245* (2013.01);
(Continued)

(58) Field of Classification Search
CPC ........... H04W 28/0221; H04W 36/245; H04W 52/365; H04W 28/085; H04W 88/06; H04W 52/325; H04B 17/327
See application file for complete search history.

(56) References Cited

U.S. PATENT DOCUMENTS 9,088,412 B2 *   7/2015   Yan ..................... H04L 1/1812
2006/0013182 A1   1/2006   Balasubramanian et al.
(Continued)

FOREIGN PATENT DOCUMENTS

WO   2010/101510 A2   9/2010

OTHER PUBLICATIONS

International Search Report for PCTGB2013-051044 dated Aug. 21, 2013.
(Continued)

*Primary Examiner* — Jay P Patel
(74) *Attorney, Agent, or Firm* — Workman Nydegger

(57) ABSTRACT

The invention relates to a cellular communication network serving mobile terminals or devices and how to optimize the switching between Dual Cell High-Speed Uplink Packet Access [DC-HSUPA] and Single Cell High-Speed Uplink Packet Access [SC-HSUPA] and vice versa. This invention makes the reconfiguration to dual cell or single cell HSUPA depending on the UE power, available capacity in the cells, sufficient data from UE, and UE battery consumption.

17 Claims, 2 Drawing Sheets

(51) Int. Cl.
  *H04W 28/08* (2009.01)
  *H04W 52/36* (2009.01)
  *H04W 36/24* (2009.01)
  *H04W 52/32* (2009.01)
  *H04B 17/327* (2015.01)
  *H04W 88/06* (2009.01)

(52) U.S. Cl.
  CPC ......... *H04W 52/365* (2013.01); *H04B 17/327* (2015.01); *H04W 52/325* (2013.01); *H04W 88/06* (2013.01)

(56) References Cited

U.S. PATENT DOCUMENTS

| | | | |
|---|---|---|---|
| 2007/0225015 | A1 | 9/2007 | Mueckenheim et al. |
| 2009/0163158 | A1* | 6/2009 | Chitrapu ............. H04W 52/262 455/127.5 |
| 2010/0130219 | A1 | 5/2010 | Cave et al. |
| 2010/0273520 | A1* | 10/2010 | Pelletier ................ H04L 5/0007 455/522 |
| 2012/0057544 | A1* | 3/2012 | Xu ........................... H04L 1/00 370/329 |
| 2012/0176947 | A1* | 7/2012 | Xi ........................ H04L 1/0026 370/311 |
| 2012/0287876 | A1* | 11/2012 | Kazmi ................... H04B 7/022 370/329 |
| 2013/0230022 | A1* | 9/2013 | Guo ...................... H04W 36/18 370/331 |
| 2013/0259023 | A1* | 10/2013 | Kuzhipatt ................ H04J 1/00 370/345 |

OTHER PUBLICATIONS

Written Opinion of the International application No. International Searching Authority for PCT/GB2013/051044.

Interdigital: "E-TFC Selection procedures for DC-HSUPA", 3GPP Draft; R2-096078, 3rd Generation Partnership Project (3GPP), Mobile Competence Centre ; 650, Route Des Lucioles ; F-06921 Sophia-Antipolis Cedex ; France, No. Miyazaki; 20091012, Oct. 12, 2009 (Oct. 12, 2009), XP050390477, [retrieved on Oct. 14, 2009] section 2.

Nokia et al: "DC-HSUPA system simulation results" 3GPP Draft; RI-091551, 3rd Generation Partnership Project (3GPP), Mobile Competence Centre ; 650, Route Des Lucioles ; F-06921 Sophia-Antipolis Cedex ; France, No. Seoul, Korea; 20090318, Mar. 18, 2009 (Mar. 18, 2009), XP050339108, [retrieved on Mar. 18, 2009] p. 2, line 5-p. 2, line 13 p. 2, line 19-p. 2, line 24 figure 1.

* cited by examiner

METHOD FOR OPTIMIZING SIGNALLING LOAD IN A CELLULAR COMMUNICATION NETWORK

CROSS REFERENCE TO RELATED APPLICATIONS

This application is a U.S. Nationalization of PCT Application Number PCT/GB2013/051044, filed on Apr. 24, 2013, which claims priority to Spanish Patent Application No. 2012/30608, filed on Apr. 24, 2012, the entireties of which are incorporated herein by reference.

FIELD OF THE INVENTION

The invention relates to a method for optimizing uplink data transmission in a communications network by using transmission mode switching techniques.

The object of the invention is to provide a method which determines whether a transmission mode switch should be triggered, either from single cell to dual cell or the other way around, from dual cell to single cell.

BACKGROUND

Enhanced Dedicated Channel (E-DCH—also known as High-Speed Uplink Packet Access—HSUPA) is a transport uplink channel used in the UMTS technology to improve capacity and data throughput and reduce the delays in dedicated channels in the uplink (UL). The maximum theoretical uplink (UL) data rate that can be achieved using HSUPA is 5.7 Mbps through the use of Quadrature Phase Shift Keying (QPSK) modulation and a 2 ms TTI (Transmission Time Interval) in a unique cell of the Universal Mobile Telecommunications System (UMTS).

In 3GPP Release 7, the use of 16QAM (Quadrature amplitude modulation) on the E-DCH was introduced, enabling the possibility of doubling the peak rate. And finally, in 3GPP Release 9, the possibility of transmitting on more than one UTRA channel/cell simultaneously was introduced. This enables the possibility of transmitting in two carriers/cells at the same time, so in case of no limit in the User Equipment (UE) power and sufficient data to use up both of the cell resources in the two carriers, the data rate may be doubled in a specific place. This is known as dual cell mode for HSUPA.

Switching from single cell to dual cell mode entails higher power consumption for the UEs due to the higher control plane overhead and also higher user plane throughput. Furthermore, switching from single cell to dual cell mode could sometimes lead to cell overload if not managed properly; in many cases the data rate needed for the UL could be borne by a single cell not requiring any switching to dual cell mode of operation on UL.

The problem is to know when it is more efficient to move to dual cell transmission from single cell transmission, and vice versa and exisiting solutions are static, not dynamic depending on the connections and radio conditions

SUMMARY OF THE INVENTION

According to one embodiment of the invention, a method is provided to enable switching between single and dual cell mode in an efficient way, solving the above mentioned problems, as claimed in claim 1. The method hereby described proposes a solution to the problem of finding the optimum configuration for a given User Equipment [UE] in the Uplink between single and dual cell configuration.

The method of optimization of this invention is based on a reconfiguration between Dual Cell and Single Cell mode performed at RNC [Radio Network Controller] level.

The RNC [Radio Network Controller] is able to make the decision using measurements/parameters received via existing standardised signalling from UE or Node B, in conjunction with parameters configured within the RNC directly. If the needed measurements or parameters are not available in RNC [Radio Network Controller] via existing standardised mechanisms, a new signalling to the RNC [Radio Network Controller] is required from the Node B or the User Equipment [UE].

The method of the invention is based on the three following main steps:

First, an evaluation of the power available in the User Equipment [UE]: is there enough power to operate dual cell in the UE? This can be determined using following input:

a. User Equipment Power Headroom [UPH]: This is a measurement (measured in dB) reported by the User Equipment [UE] to the Node B. It states the power difference between maximum power available in the User Equipment [UE] and currently transmitted Dedicated Physical Control Channel [DPCCH] power. This is an existing UE measurement defined in the 3GPP standard.

b. Received Signal Code Power [RSCP] measurements: This is a measurement (measured in dBm) of the Received Signal Code Power [RSCP] of the common Pilot Channel [CPICH] channel received by the User Equipment [UE], and is reported to the RNC [Radio Network Controller]. This is an existing UE measurement defined in the 3GPP standard.

c. Pathloss: Can be calculated from existing received signal code power [RSCP] measurement (in dB) reported to RNC [Radio Network Controller], or from comparing UPH and Dedicated Physical Control Channel [DPCCH] received power at the Node B. Both are in values of dB.

The evaluation of whether there is enough power available for data can be done using the following formula:

$$P_{data} = UE\_power\_max - TxpowerDPCCH\_primaryCarrier - TxpowerHS\text{-}PCCH\_primaryCarrier - TxpowerE\text{-}DPCCH\_primaryCarrier - PowerDPCCH\_secondaryCarrier - Margin\_for\_CP\ Power$$

OR $$P_{data} = UE\_Power\_Headroom - TxPowerDPCCH\_secondaryCarrier - Margin\_for\_CP\ Power$$

Where:

UE_power_max: is the maximum output power of the UE, this is typically 23 dBm.

TxpowerDPCCH_primaryCarrier: it is defined as the power used by the UE for the normal control channels in the primary carrier. This can be calculated with the DPCCH power received by the Node B plus the pathloss (defined in c. above).

TxpowerHS-DPCCH_primaryCarrier: it is the power used by the UE for the HSDPA control channels in the primary carrier. This can be calculated with the HS-DPCCH power received by the Node B plus the pathloss (defined in c. above).

TxpowerE-DPCCH_primaryCarrier: it is the power used by the UE for the E-DCH control channels in the primary carrier. This can be calculated with the E-DP-CCH power received by the Node B plus the pathloss (defined in c. above).

TxPowerDPCCH_secondaryCarrier: Said Transmission [Tx] power of a secondary carrier [TxPowerDPCCH_secondaryCarrier] is Dedicated Physical Control Channel [DPCCH] power transmitted on the secondary carrier when the User Equipment [UE] is in Dual Cell High-Speed Uplink Packet Access [DC-HSUPA] mode. This element may be estimated either via some comparison with the TxpowerE-DPCCH_primaryCarrier, or by some other independent means. Such independent means are where it is estimated based on "pathloss" (see above c.), either using Received Signal Code Power [RSCP] (see b.) measurements of the primary carrier or those of the secondary carrier.

UE_Power_Headroom: is the maximum output power of the UE, this is typically 23 dBm.

Margin for Control Plane (CP) Power: This is a static parameter which shall consider how much of the remaining power is available for data transmission on the secondary carrier, and may additionally consider the power required for E-DPCCH, some hysteresis in the mode switching decision, take into account a power backoff (due to radiofrequency impairments) of the mobile, as well as the estimated gain of the DC-HSUPA, as well as the calculated pathloss. May be configured by the RNC [Radio Network Controller] or Node B.

Then, if Pdata] Pmin_data value means that there is enough power available. Pmin_data is a threshold defined by the operator to decide to do the up-switch to DC-HSUPA. Pdata [Pmin_data means that there is not enough power available, then the User Equipment [UE] should remain in single cell [SC-HSUPA]. The configured value of Pmin_data can be used to compare with the situation if single-carrier mode of operation were used.

Second, an evaluation of the data volume to be transmitted: is there enough data amount to transmit. for justifying the use of dual cell mode? If the User Equipment [UE] does not hold sufficient data to be transmitted, it is not very efficient from an uplink resource management point of view to operate the User Equipment [UE] in the dual cell [DC-HSUPA] mode, so there would be no need to switch from single cell [SC-HSUPA] to the dual cell [DC-HSUPA] mode. The reason is that in dual cell mode, more power is needed for the control plane of the new added cell. Switching between single cell and dual cell mode allows to either optimise resource usage to reduce overhead (down-switch from dual cell to single cell) or optimise throughput and load balancing performance in a group of 2 carriers by allowing the user to fully use the dual cell resources (up-switch from single cell to dual cell, or allow it to switch data transmission faster and more reliably from one cell to the other—due to the pilots being available on both cells).

The method of the invention is able to identify amounts of data to be transmitted by a User Equipment [UE] it actually may use up to three different ways to determine whether a User Equipment [UE] has sufficient data to transmit or not, all of which could be combined to some degree:

Use of "Scheduling Information" signalled via the Media Access Control [MAC] from the User Equipment [UE] to the Node B to indicate the amount of available data ready to be transmitted by the User Equipment [UE]. This is an existing signalling mechanism defined in 3GPP standard. In the scheduling information there is a field indicating the number of bytes in the UE buffer. If the number of bytes is higher than a data threshold value, the network can consider to up-switch to DC-HSUPA.

Use of "Happy Bit" signalled via Media Access Control [MAC] from the User Equipment [UE] to the Node B. If the User Equipment [UE] is "unhappy" is because it has more data to transmit and the capacity to send it, but the network has not granted enough resource for the single cell transmission. This is an existing signalling mechanism defined in 3GPP standard. If the UE sends an "unhappy" bit indication the network can consider to up-switch to DC-HSUPA.

Characterisation of the User Activity based on the data transmitted over the last seconds. This is based on the use of timers in the Node B to know if User Equipment [UE] is exceeding a given data volume during a certain period measured in seconds. This trigger would indicate that the User Equipment [UE] is transmitting a big amount of data, so it has sufficient data to use dual cell [DC-HSUPA] transmission.

All the previous criteria can be used for the different QoS (Quality of Service) type configured to the User Equipment [UE].

If, as a result of the above mentioned procedure, the User Equipment [UE] is determined to have enough data to transmit, an up-switch between single cell [SC-HSUPA] to dual cell [DC-HSUPA] involves a higher battery consumption, and sometimes the User Equipment [UE] is limited by battery consumption. Some signalling already exists to allow report from the User Equipment [UE] to the RNC [Radio Network Controller] via RRC in 3GPP Standards (Release 6 specifications) whether it 'Does Not Benefit From Battery Consumption Optimisation'. If the device has limitation of battery consumption (e.g. Smartphone), then it is advisable to have the possibility in the network to favour the use of Single Cell HSUPA operation, as there is less transmitted power.

The method of the invention also observes an evaluation of cell load: considering the load of the observed cell is it beneficial to use dual cell mode? If a cell is overloaded in terms of Uplink Interference, the network needs to be able to down-switch some DC-HSUPA users to single cell mode when control plane overhead becomes prohibitive in terms of cell capacity. For some high load scenarios the up-switch of active DC-HUSPA users to dual cell mode can actually provide extra capacity. In order to decide what strategy is more appropriate in highly loaded cells (i.e. when the Noise Rise is very high), in addition to the other components above, the RNC can use the following information:

Load level in each of the two cells: The radio interface capacity for the uplink, given by the maximum noise rise allowed by the RNC for the considered cell. Then it can be calculated which % of the noise rise is already used within each cell. The RTWP measurement can be used as an input for these calculations. RTWP [Received Total Wideband Power] measurement: This is the power received by the Node B within the carrier frequency. It is measured by Node B and can be reported to RNC [Radio Network Controller] for both carriers individually. Every measure of % of available bandwidth is compared with specific configurable thresholds to trigger the next Step:

Number of HSUPA users (users with a configured HSUPA RAB in the cell) and/or Cell Throughput carried.

Another condition to bear in mind is the amount or number of HSUPA users; based on this information, which is available at RNC level, the RNC can make the decision to up-switch or down-switch DC-HSUPA users.

When the number referring the amount of users increases, there is a higher probability of hitting noise rise limit in the cells, which will limit the maximum throughput available to User Equipments [UEs] in single-cell HSUPA mode. Configuring User Equipments [UEs] in dual-cell HSUPA mode would allow these User Equipments [UEs] to use any spare resource available in the secondary carrier (assuming that a perfect balancing of load across cells cannot be obtained), which may allow an improvement in available uplink data throughput. However, as the number of users increases further, there may also be a point where the control plane overhead of users configured in Dual-cell HSUPA mode is actually providing an overall degradation to available throughput when compared to overall gain of being able to freely schedule data transmission on either or both carriers.

When the number of HSUPA plus the number of DC-HSUPA users is higher than a defined threshold: [Total_HSUPA_DC-HSUPA_Users_Threshold_UP_LOW] the RNC should re-configure SC-HSUPA users to DC-HSUPA.

When the number of HSUPA plus the number of DC-HSUPA users is higher than a defined threshold: [Total_HSUPA_DC-HSUPA_Users_Threshold_DOWN_LOW] the RNC should re-configure DC-HSUPA users to SC-HSUPA.

When the number of HSUPA plus the number of DC-HSUPA users is higher than a defined threshold: [Total_HSUPA_DC-HSUPA_Users_Threshold_DOWN_HIGH] the RNC should reconfigure DC-HSUPA users to SC-HSUPA starting with the DC-HSUPA users with lower activity by the RNC (average throughput below over a defined period) and/or the lower priority QoS users.

When the number of HSUPA plus the number of DC-HSUPA users is lower than a defined threshold: [Total_HSUPA_DC-HSUPA_Users_Threshold_UP_HIGH] the RNC should reconfigure SC-HSUPA users to DC-HSUPA starting with the DC-HSUPA users with higher activity by the RNC (average throughput below over a defined period) and/or the higher priority QoS users.

Another possibility to decide whether to down-switch the user in the RNC is to estimate the reduction in capacity that could be caused by DC-HSUPA users due to the transmission of the control channel in both cells, namely Cell Throughput carried. In this sense, the total cell throughput needs to be monitored. If the Cell throughput for a given noise rise is below a threshold, that means the down-switch to SC-HSUPA needs to be done. This down-switch can be initiated, for example, with the lower priority QoS users or with the lower active users.

Both number of users and cell throughput criteria can be combined with the calculation of the average throughput per user. Again a new threshold can be defined to initiate the down-switch procedures to SC-HSUPA.

In another embodiments of the object of the invention further combinations of the different above mentioned conditions are also taken into account, i.e. a combination of the "Enough data to transmit" threshold with the "cell loading" threshold. If the cell loading is very low, then the active users would require more peak data activity to reach the noise rise limit in the cell. If the active users are unlikely to reach this limit, due to a low peak data activity, then putting them into DC-HSUPA mode would just waste its transmission power (due to additional control-plane overhead). As the cell loading gets higher, each user would require less peak data activity to reach the noise rise limit (for a ]0% probability of requiring resource at the same time). Therefore a "cell loading weighting factor" could be applied to the "enough data to transmit" data threshold to ensure the threshold gets lower as the cell loading increases, and higher as the cell loading decreases.

This may mean that e.g. the thresholds: [Total_HSUPA_DC-HSUPA_Users_Threshold_UP_LOW] and [Total_HSUPA_DC-HSUPA_Users_Threshold_DOWN_LOW] may not be needed, as they would be implicitly taken into account within the calculated "enough data to transmit" threshold. Once the number of users gets higher than the: [Total_HSUPA_DC-HSUPA_Users_Threshold_DOWN_HIGH] threshold, this threshold could take precedence over the value of the "enough data to transmit" threshold.

If "Happy" bit is used as the "enough data to transmit" threshold, then it would directly relate to cell loading, as the higher the cell loading, the more likely the UE is going to indicate that it is "unhappy".

An additional component, load variability weighting factor, would consider some historical information of how variable the load is within the two cells. It is possible that the long term load balancing of users in the two cells is working efficiently enough to ensure that there is no leftover capacity for which DC-HSUPA could get benefit. Therefore applying a weighting factor to the "cell loading" thresholds or "enough data to transmit" thresholds would allow the RNC to take this into account. This "load variability weighting factor" could be re-calculated on a long-term or short-term basis.

All of the points above relate to the decision of whether the UE should be configured in DC-HSUPA mode or not. Once the configuration has taken place, and the UE is transmitting on DPCCH on both carriers, the network scheduler needs to decide on which carriers it should schedule data on. This is a decision of the Node B scheduler based on the real-time loading conditions of the cell, and will also take into account the remaining power available in the UE for data transmission.

BRIEF DESCRIPTION OF THE DRAWINGS

For a better understanding of the present invention, reference will now be made, by way of example only, to the accompanying drawings in which:—

DETAILED DESCRIPTION OF A PREFERRED EMBODIMENT

Figure 1:
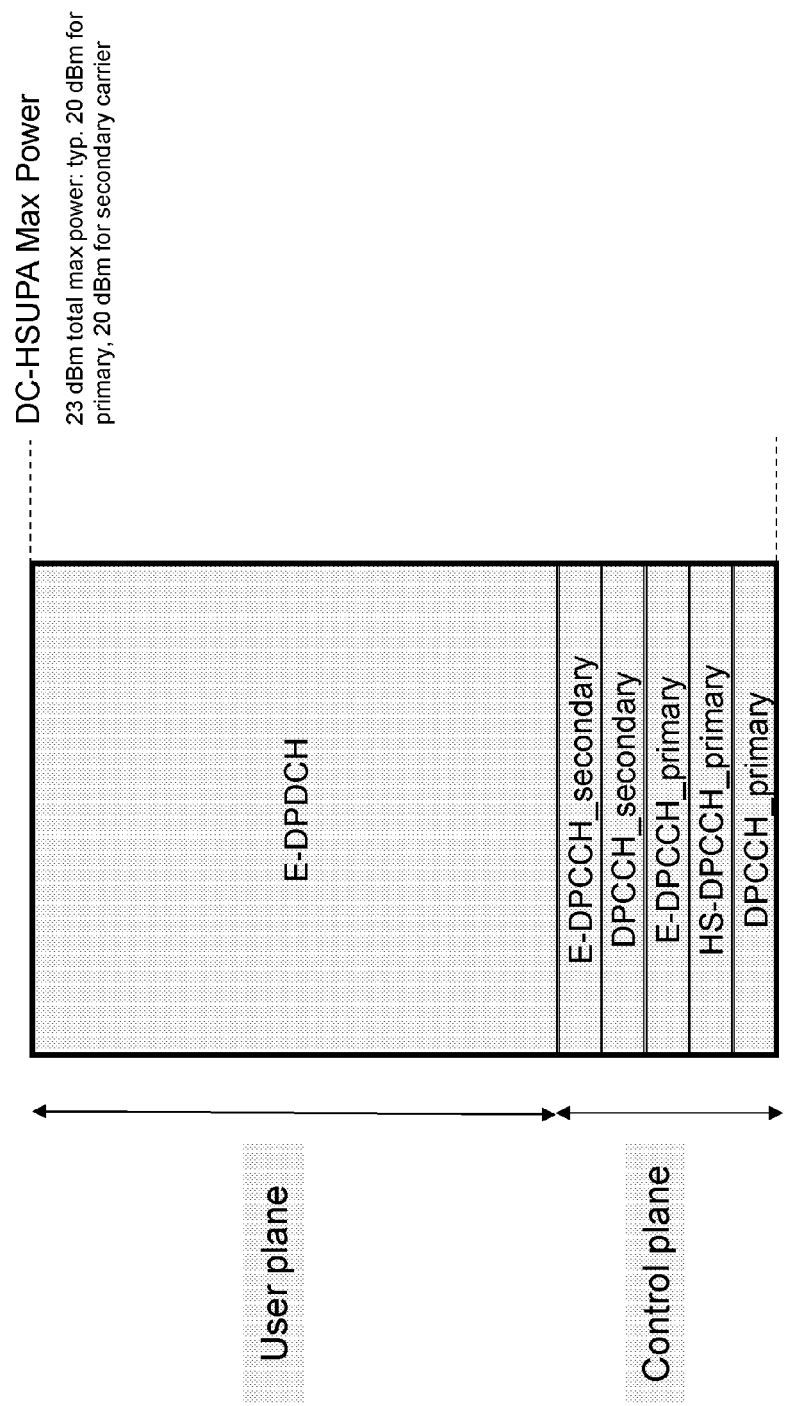
FIG. 1 shows and scheme of the total power available in the UE and the different channels using it.
Figure 2:
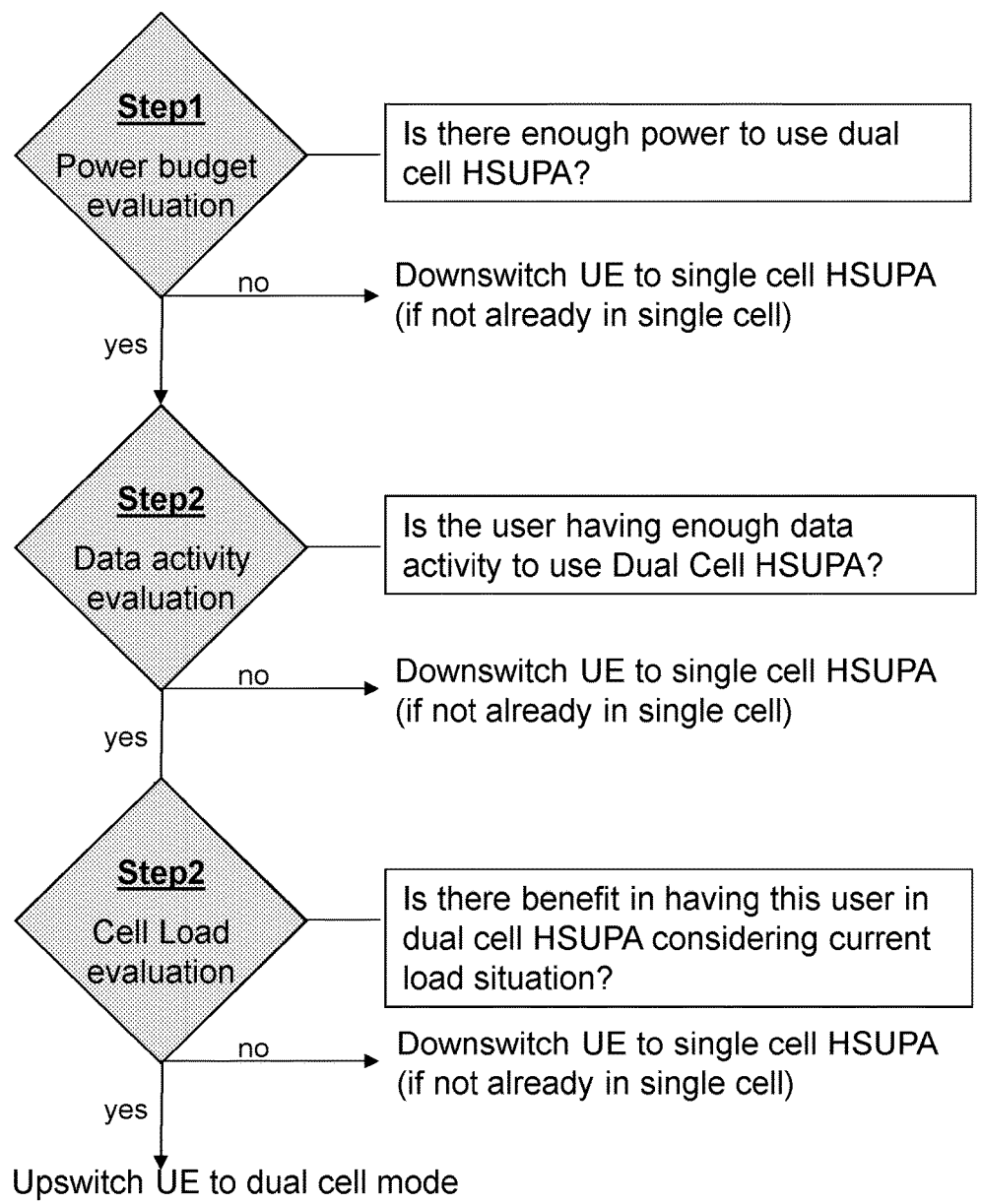
FIG. 2 depicts a flowchart of the method of the invention to change from SC-HSUPA to DC-HSUPA.

There now follows a more detailed description of an embodiment of the invention describing an optimization of data transmission in a cellular communication network by carrying out a reconfiguration between Dual Cell High-Speed Uplink Packet Access [DC-HSUPA] and Single Cell High-Speed Uplink Packet Access [SC-HSUPA], a vice versa, performed at Radio Network Controller [RNC] level.

Said reconfiguration or switching is mainly based on three factors:

A power level value of the User Equipment [UE],

An amount of data in the User Equipment [UE] to be transmitted,

A load value of at least one of the cells.

According to said values, which can be determined and monitored as earlier described, the method of the invention would perform a switch from Single Cell High-Speed Uplink Packet Access [SC-HSUPA] mode to the Dual Cell High-Speed Uplink Packet Access [DC-HSUPA] mode, or from Dual Cell High-Speed Uplink Packet Access [DC-HSUPA] mode to Single Cell High-Speed Uplink Packet Access [SC-HSUPA] mode; following the rules hereby described.

In a preferred embodiment of the invention a User Equipment [UE] is switched from and Single Cell High-Speed Uplink Packet Access [SC-HSUPA] mode to the Dual Cell High-Speed Uplink Packet Access [DC-HSUPA] mode, said triggering is accomplished attending to the result of determining whether a User Equipment [UE] Tx Power available shows a power level below a power threshold level then the User Equipment [UE] is not reconfigured thus remaining in single cell HSUPA, if the capacity of one of the cells is not enough then the User Equipment [UE] is not reconfigured either thus remaining in single cell, same applies when the User Equipment [UE] has not got sufficient data to transmit then the User Equipment [UE] is not reconfigured either thus remaining in single cell, finally if the User Equipment [UE] shows a battery limitation then the User Equipment [UE] is not reconfigured either thus remaining in single cell In brief, the User Equipment [UE] is reconfigured or switched from Single Cell High-Speed Uplink Packet Access [SC-HSUPA] mode to Dual Cell High-Speed Uplink Packet Access [DC-HSUPA mode and is steered towards using default traffic steering rules for High-Speed Uplink Packet Access [HSUPA] users only when the results of the determinations carried out about yield values above the threshold values.

These conditions should be re-evaluated periodically according to one configurable parameter to make sure that after call setup the user can get the most adequate resources at all time.

In another embodiment of the invention the procedure early described reverts, then a switch from Single Cell High-Speed Uplink Packet Access [SC-HSUPA] mode to the Dual Cell High-Speed Uplink Packet Access [DC-HSUPA] mode is triggered, said triggering is accomplished attending to the result of determining whether the User Equipment [UE] Tx Power available shows a power level above a threshold level, and there is remaining capacity in both the cells, and the User Equipment [UE] has got sufficient data to transmit and the User Equipment [UE] shows no limitation in battery level; then, the User Equipment [UE] is reconfigured or switched from Single Cell High-Speed Uplink Packet Access [SC-HSUPA] mode to the Dual Cell High-Speed Uplink Packet Access [DC-HSUPA] mode and is steered towards using default traffic steering rules for High-Speed Uplink Packet Access [HSUPA] users only when the results of the determinations carried out about yield values above the threshold values.

These conditions are periodically re-evaluated according to one configurable parameter to make sure that after call setup the user can get the most adequate resources at all time.

The invention claimed is:

1. A method for optimizing data transmissions in a cellular communication network by determining whether a User Equipment (UE) should transition from being a Dual Cell with High-Speed Uplink Packet Access (HSUPA) UE to being a Single Cell with HSUPA UE, the method being performed at a Radio Network Controller (RNC) level, the method comprising:

determining at least one parameter for a UE, the at least one parameter being selected from a set of parameters, the set of parameters comprising: (1) a power level value of the UE, (2) an amount of data the UE will transmit, and (3) a load value of the UE; and when at least one condition of a set of conditions is met, causing the UE to switch from being a Dual Cell with HSUPA UE to being a Single Cell with HSUPA UE, wherein the set of conditions includes: (1) a condition in which the power level value of the UE is below a particular power level threshold value, (2) a condition in which the amount of data the UE will transmit is below a particular data transmit threshold value, (3) a condition in which an amount of allocated users is below an allocated users threshold value, and (4) a condition in which a cell throughput value is below a cell throughput threshold value.

2. The method of claim 1, wherein determining that the power level value of the UE is below the power level threshold value is carried out by at least one of the following steps:

measuring a UE Power Headroom (UDH) reported by the UE to a Node B which is related to a power difference between maximum power available in the UE and currently transmitted Dedicated Physical Control Channel (DPCCH) power;

measuring a Received Signal Code Power (RSCP) of the common Pilot Channel (CPICH) received by the UE reported to a RNC; or measuring a Dedicated Physical Control Channel (DP-CCH) power per UE received at the Node B.

3. The method of claim 2, wherein the DPCCH power per UE received at the Node B is measured by at least one of the following formulae:

$$Pdata=[UE\ Power\ Max]-[Tx\ Power\ DPCCH\ Primary\ Carrier]-[Tx\ Power\ HSDPCCH\ primary\ carrier]-[Tx\ power\ EDPCCH\ primary\ Carrier]-[TxPower\ DPCCH\ secondary\ Carrier]-[Margin\ for\ CP\ Power],$$

or $$Pdata=[UE\ Power\ Headroom]-[Tx\ Power\ DPCCH\ secondary\ Carrier]-[Margin\ for\ CP\ Power],$$

wherein:

[UE power max] is a maximum output power of the UE,

[Tx power DPCCH primary Carrier] is a power used by the UE for normal control channels in a primary carrier,

[Tx power HSDPCCH primary Carrier] is a power used by the UE for HSUPA control channels in the primary carrier,

[Tx power EDPCCH primary Carrier] is a power used by the UE for Enhanced Dedicated Channel (E-DCH) control channels in the primary carrier,

[TxPower DPCCH secondary Carrier] is DPCCH power transmitted on a secondary carrier when the UE is in a Dual Cell mode,

[UE Power Headroom] is a maximum output power of the UE, and

[Margin for CP Power] is a static parameter related to a remaining power available for data transmission on the secondary carrier.

4. The method of claim 1, wherein determining the amount of data the UE will transmit is carried out by at least one of the following procedures:

using a Scheduling Information signaled via a Media Access Control (MAC) from the UE to a Node B to indicate the amount of data the UE will transmit;

using a Happy Bit signaled via the MAC from the UE to the Node B; or using timers in the Node B to determine whether the amount of data the UE will transmit exceeds a certain data volume during a predefined period of time.

5. The method of claim 1, wherein the load value of the UE is determined by at least one of the following procedures:

determining a load level of the UE when the UE is either in a Dual Cell mode or a Single Cell mode;

determining a number of HSUPA users; or determining the cell throughput value of the UE when the UE is either in the Dual Cell mode or the Single Cell mode.

6. The method of claim 5, wherein the number of HSUPA users is supplied by a Radio Network Controller (RNC).

7. A method for optimizing data transmissions in a cellular communications network by determining whether a User Equipment (UE) should transition from being a Dual Cell with High-Speed Uplink Packet Access (HSUPA) UE to being a Single Cell with HSUPA UE, the method comprising:

upon a condition in which a number of Single Cell with HSUPA UEs plus a number of Dual Cell with HSUPA UEs is higher than a defined threshold up-switch low value, reconfiguring a first Single Cell with HSUPA UE to be a first Dual Cell with HSUPA UE; and upon a condition in which the number of Single Cell with HSUPA UEs plus the number of Dual Cell with HSUPA UEs is lower than the defined threshold up-switch low value, causing the following to be performed:

reconfiguring the first Single Cell with HSUPA UE to be the first Dual Cell with HSUPA UE; and starting the first Dual Cell with HSUPA UE at approximately a same time as a Quality of Service (QoS) user, wherein the QoS user was previously assigned a priority level designated as high.

8. The method of claim 7, wherein the method further comprises:

for the first Dual Cell with HSUPA UE, determining both a transmission power level value and an amount of data that will be transmitted; and upon determining that one or more conditions are satisfied, reconfiguring the first Dual Cell with HSUPA UE back to being a newly reconfigured Single Cell with HSUPA UE, wherein one of the one or more conditions includes a determination that the transmission power level value is below a power level threshold value.

9. The method of claim 8, wherein the method further comprises:

for the first Dual Cell with HSUPA UE, determining an amount of data that will be transmitted.

10. The method of claim 9, wherein the one or more conditions that are required to be satisfied prior to the first Dual Cell with HSUPA UE being reconfigured to be the newly reconfigured Single Cell with HSUPA UE further include:

the amount of data that will be transmitted by the first Dual Cell with HSUPA UE is below a data threshold value;

an amount of allocated users is below a threshold value for allocated users; and a cell throughput value is below a threshold value for cell throughput.

11. The method of claim 8, wherein determining the transmission power level value is carried out by at least one of the following steps:

measuring a User Equipment Power Headroom (UPH);

measuring a Received Signal Code Power (RSCP); or measuring a Dedicated Physical Control Channel (DP-CCH) power.

12. A method for determining whether a user device should transition from being a single cell device with high-speed uplink packet access (HSUPA) to being a dual cell device with HSUPA, the method comprising:

determining a power level of a user device that is currently configured to be a single cell device with HSUPA;

determining an amount of data the user device is projected to transmit;

determining a cell load of the user device; and upon a condition in which at least one condition included within a set of conditions is satisfied, reconfiguring the user device to be configured as a dual cell device with HSUPA, wherein the set of conditions includes: (1) the power level being above a particular power level threshold, (2) the amount of data that is projected to be transmitted being above a particular data transmission threshold, and (3) the cell load being above a particular cell load threshold.

13. The method of claim 12, wherein determining the power level of the user device comprises:

measuring a dedicated physical control channel power of the user device.

14. The method of claim 12, wherein determining the amount of data the user device is projected to transmit comprises:

measuring a current amount of data within a predefined period of time.

15. The method of claim 12, wherein a second condition included within the set of conditions is at least partially based on a battery consumption of the user device.

16. The method of claim 12, wherein a maximum power level of the user device is 23 dBm.

17. The method of claim 12, wherein the set of conditions are periodically re-evaluated.

* * * * *